Sept. 15, 1964     S. W. JAMES     3,148,804
MEASURING AND DISPENSING DEVICE FOR FINELY DIVIDED DRY MATERIAL
Filed July 3, 1959     2 Sheets-Sheet 1
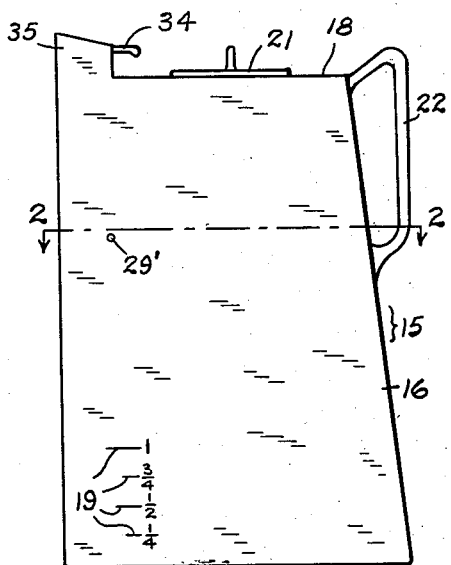
Fig. 1
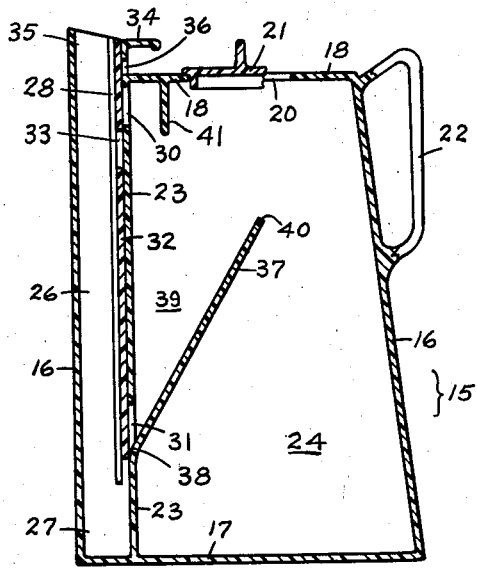
Fig. 3
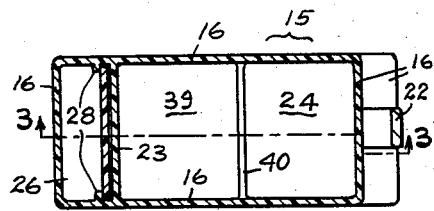
Fig. 2
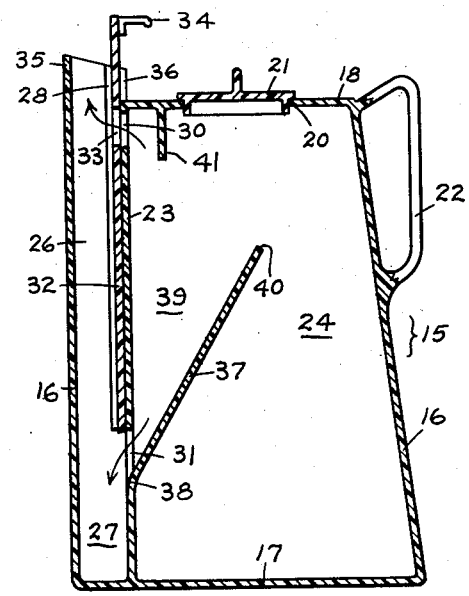
Fig. 6
Fig. 5
Fig. 4
INVENTOR.
Stanley W. James
BY
*[signature]*
ATTORNEY

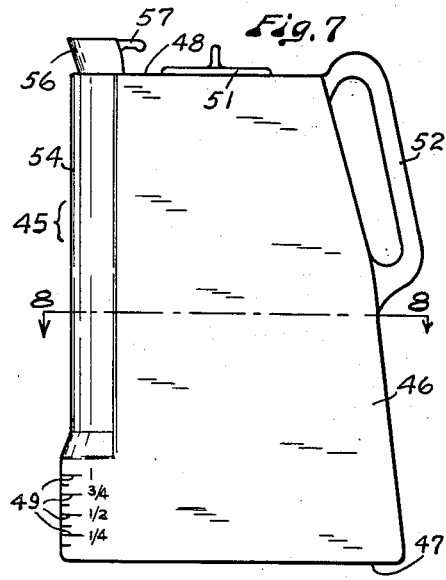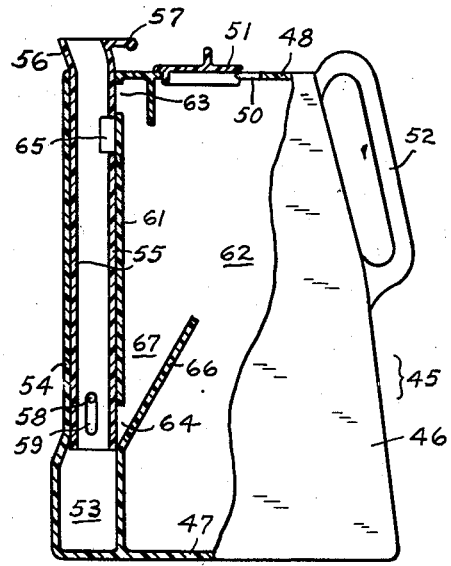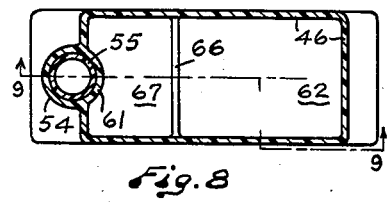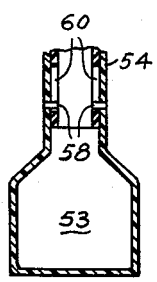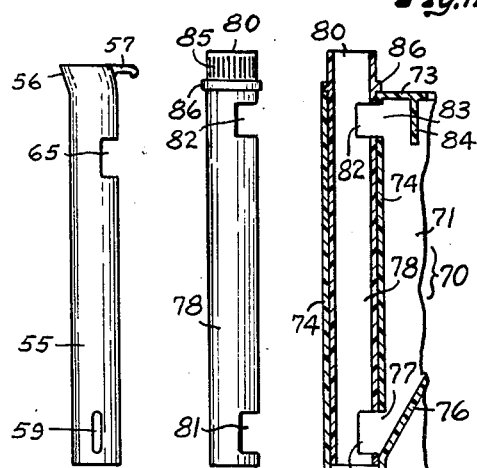

United States Patent Office 3,148,804
Patented Sept. 15, 1964

3,148,804
MEASURING AND DISPENSING DEVICE FOR
FINELY DIVIDED DRY MATERIAL
Stanley W. James, 22202 60th W., Mountlake
Terrace, Wash.
Filed July 3, 1959, Ser. No. 824,893
2 Claims. (Cl. 222—158)

My invention relates to a measuring and dispensing device for finely divided dry materials and is hereinafter referred to as a measuring and dispensing device for powdered soap but it may be used for numerous other materials.

Powdered soaps and like detergents are ordinarily sold and handled in cardboard cartons and it is common practice to dip or pour the soap from these cartons into a measuring cup from which it is emptied into water. This requires the user to keep a measuring cup available at all times and necessitates the expenditure of time and effort in measuring out the soap. Also the use of cardboard cartons around and in connection with water often results in the cartons becoming wet to such an extent that the powdered soap may become packed or solidified in the carton or the carton may burst and the soap spill out.

An object of my invention is to provide a measuring and dispensing device which will enable a user to accurately and easily dispense therefrom a measured amount of powdered soap, thus doing away with the usual measuring cup and saving much of the time, motion and inconvenience occasioned by its use.

Another object is to provide a measuring and dispensing device formed of plastic which is impervious to moisture and at least partially transparent so that the powdered soap or like material therein will be kept dry and will always be visible.

Another object is to provide a measuring and dispensing device from which different measured amounts of powdered soap or like finely divided dry material can be dispensed without requiring any adjustment of the measuring means and to further provide such a device which is adapted for free pouring of the contents without using the measuring means.

Another object is to provide a measuring and dispensing receptacle having therein a main storage compartment and a combined measuring chamber and material outlet compartment, said receptacle having a valve controlled flow passageway in the wall between the main storage compartment and the upper end portion of the measuring chamber and having an inclined baffle wall extending from the lower edge of said flow passageway upwardly and rearwardly in the main storage compartment, said baffle wall cooperating with the receptacle walls in forming a hopper which always maintains a supply of powdered material ready for passage through the flow passageway into the measuring chamber.

Other objects of my invention are to provide a measuring and dispensing receptacle for finely divided dry material which is simple in construction, not expensive to manufacture, accurate in measurement, efficient in operation, light in weight, always ready for use and easy to handle and pour from.

The above mentioned general objects of my invention, together with others inherent in the same, are attained by the mechanism illustrated in the following drawings, throughout which like reference numerals indicate like parts:

FIGURE 1 is a side elevation of a measuring and dispensing device constructed in accordance with my invention;

FIG. 2 is a cross section of the same taken on broken line 2—2 of FIG. 1;

FIG. 3 is a view in vertical medial section, taken substantially on broken line 3—3 of FIG. 2, and showing a sliding valve in a closed position;

FIG. 4 is a sectional view similar to FIG. 3 except that the sliding valve is shown in an open position;

FIG. 5 is a detached isometric view of a sliding valve member;

FIG. 6 is a fragmentary isometric view, with parts broken away, showing parts of valve guiding means;

FIG. 7 is a view in side elevation of a measuring and dispensing device of modified form;

FIG. 8 is a cross sectional view taken on broken line 8—8 of FIG. 7;

FIG. 9 is a view in vertical medial section taken substantially on broken line 9—9 of FIG. 8, and showing a tubular dispensing valve in a closed position;

FIG. 10 is a view similar to FIG. 9 except that the tubular dispensing valve is shown in an open position;

FIG. 11 is a detached view in elevation of the tubular dispensing valve;

FIG. 12 is a fragmentary sectional view taken substantially on broken line 12—12 of FIG. 10;

FIG. 13 is a fragmentary view in vertical section of another modified form of my measuring and dispensing device using a rotatively adjustable tubular dispensing valve; and FIG. 14 is a detached elevation of the valve shown in FIG. 13.

Like reference numerals refer to like parts throughout the several views.

The form of invention shown in FIGS. 1 to 6 comprises a normally upright receptacle formed preferably of plastic which is at least sufficiently transparent so that the material within the receptacle can be seen. The receptacle 15 comprises side walls 16, a bottom wall 17 and a top wall 18. An opening 20, through which powdered soap or like material can be poured into the receptacle, is provided in the top wall 18 and can be closed by a cover member 21. The member 21 fits snugly enough so that it will not come off when the receptacle 15 is inverted even if the contents of the receptacle rest on the cover at that time. A handle 22 is provided on the rear side of the receptacle 15.

An upright wall or backing plate 23 extends from bottom to top of the receptacle near the forward or front side thereof and divides said receptacle into a wider and larger material storage compartment 24 and a combined material outlet compartment 26 and measuring chamber or compartment 27 of narrower dimension and smaller size than the storage compartment 24. The measuring chamber 27 is directly below and in open communication with the pouring compartment 26. Preferably graduations 19 are marked on the exterior of the walls 16 which surround the measuring compartment 27. These graduations can be in terms of one fourth, one half, three fourths, and one cup, as shown in FIG. 1, or they can be in different terms.

The upright wall 23 is provided near its upper end and a short distance downwardly from the top wall 18 with a free flow passageway 30 through which finely divided dry material can pass without entering the measuring receptacle and said wall 23 is further provided, at a predetermined distance up from the bottom 17 and substantially at the upper end of the measuring compartment 27, with a passageway 31 through which material entering said measuring compartment 27 can pass. A valve member 32, which in the form of invention disclosed in FIGS. 1 to 6 is a flat plate, is slidably disposed in the outlet compartment 26 with one face thereof against the upright partition wall 23 and the marginal portions of its other face engaged and guided by narrow guide flanges 28, FIG. 2, on the side walls 16 of the receptacle 15. Preferably stop means is provided to limit both the upward and the downward movement of the valve member 32. This can be done by providing a notch 29 in one edge of said valve member 32 and inserting a stop member 29' through a side of the receptacle 15 so that an end of the stop member 29' extends into the notch 29.

The valve member 32 has a free flow opening 33 therein adjacent its upper end which is offset relative to the free flow passageway 30 in partition wall 23 when said valve member 32 is in its lowermost position, as shown in FIG. 3 and which registers with said passageway 30 when said valve member 32 is in the raised position shown in FIG. 4. The upper end portion of the valve member 32 extends above the top wall 18 of the receptacle 15 and has a lifting handle 34 rigidly secured thereto which may be engaged by the finger in moving said valve 32.

The portions of the receptacle walls 16 which form three sides of the outlet compartment 26 extend above the plane of the top wall 18 and form a pouring spout 35 through which material may be discharged. The guide flanges 28, FIG. 6, extend to the top end of this pouring spout 35 and said spout is further provided with other guide flanges 36 which are spaced from and cooperate with flanges 35 in guiding the valve member 32.

An inclined baffle plate or wall 37 is provided within the storage compartment 24. The lower edge 38 of the baffle 37 is united with or makes contact with the upright partition 23 at the location of the lower edge of the material passageway 31. The baffle wall 37 extends upwardly and rearwardly from the lower edge of passageway 31 in diverging relation to the upright partition wall 23 and cooperates in forming a hopper 39 from which material is directed into the measuring chamber 27. The baffle 37 terminates in a top edge 40 positioned a substantial distance below the top wall 18 and about mid way between the partition wall 23 and the rear wall 16 of the receptacle and over which material from the lower portion of the compartment 24 can pass when the receptacle is tilted for pouring.

Preferably a baffle member 41 extends from the top wall 18 of the receptacle downwardly in spaced relation from the free flow passageway 30 and terminates slightly below the level of the lower edge of said passageway 30. This baffle prevents an excessive amount of material from entering the outlet compartment 26 when the dispenser is inverted in pouring and then turned back into upright position. The baffle 41 is a safety device which functions in case the user fails to close the free flow valve opening 30 after free pouring. This dispenser is practical and operative without the baffle 41.

In the use of this measuring and dispensing device the valve member 32 is closed as shown in FIG. 3 and the receptacle is at least partially filled with dry powdered material. If a measured amount is to be dispensed the valve 32 is at least partially opened while observing through the transparent walls 16 of the receptacle the powdered material as it flows into the measuring chamber 27. When the desired amount of material has entered the measuring chamber 27, as indicated by the graduations 19, the valve 32 is closed to stop the flow of material and the receptacle 15 is tilted or inverted to discharge this measured amount of material from the spout 35. If the supply of material in the compartment 24 is below the top edge 40 of the baffle 37 the container can be tilted to cause material to flow over said top baffle edge 40 into the triangular hopper 39 where it will be available for entry into measuring chamber 27. In the ordinary course of use of the device the baffle 37 will always maintain a supply of material in the hopper 39 as long as any material remains in the receptacle 15.

To by-pass the measuring chamber 27 for free pouring of the material the valve 32 is moved upwardly so that discharge openings 30 and 33 are in registration, the receptacle is tilted for pouring and any desired amount of material is poured out in a continuous stream.

The form of invention disclosed in FIGS. 7 to 12 inclusive comprises a receptacle 45 preferably formed of plastic which is at least transparent enough so that material in the receptacle can be observed therethrough. The receptacle 45 has side walls 46, a bottom wall 47, a top wall 48 provided with filler opening 50 and cover 51, and a handle 52. The forward portion of the receptacle 45 is provided near the bottom 47 with a measuring chamber 53 which is externally marked with graduations 49. The measuring chamber 53 communicates with an upright tubular discharge housing 54. A tubular discharge valve 55 is slidably disposed within the housing 54 and terminates at its upper end in an inclined pouring spout 56 which extends above the top wall 48. Spout 56 has a finger piece or handle 57 by which the valve tube 55 can be slidably moved. At least one stop pin 58 operating in a slot 60 in tube 55 limits sliding movement, both upwardly and downwardly, of the tube 55.

The upright rear wall 61 of the tubular discharge housing 54 is in the nature of a partition between said housing 54 and a material storage compartment 62 in the receptacle 45. Said partition wall 61 is provided near its upper end with a free flow passageway 63 and is further provided, at the location of the upper end of the measuring chamber 53, with a passageway 64 through which material to be measured can flow from the main storage compartment 62 to the measuring chamber 53.

A free pour opening or port 65 in the upper end portion of the valve tube 55 is positioned so that it is offset relative to free flow passageway 63 when the valve member 55 is in its lowermost closed position, FIG. 9. Said passageway 65 registers with said free flow passageway 63 when said valve 55 is in a raised or open position, FIG. 10. The lower end portion of valve tube 55 will close the passageway 64 when said valve tube 55 is in its lowered position, FIG. 9, and will open said passageway 64 if said valve tube 55 is moved upwardly toward its FIG. 10 position.

An inclined baffle wall 66, similar to previously described baffle wall 37, extends from the lower edge of passageway 64 upwardly and rearwardly in storage compartment 62 and forms a hopper 67 of triangular shape between it and the wall 61.

The mode of operation of the form of invention shown in FIGS. 7 to 12 is similar to the previously described mode of operation of the form of invention shown in FIGS. 1 to 6.

The form of invention shown in FIGS. 13 and 14 comprises a plastic receptacle 70 similar to previously described receptacle 45. The receptacle 70 has side walls 71, bottom wall 72, top wall 73 and an upright tubular valve housing 74. A measuring chamber 75 is provided in the bottom end of the valve housing 74. An inclined baffle wall 76 directs material through a port or passageway 77 into the measuring chamber 75. A tubular rotary valve 78 is disposed within the valve housing 74 with its lower end at least slightly below the lower edge of the passageway 77. The valve tube 78 is open at both ends and the upper end of said tube extends above the top wall 73 and forms a pouring spout 80. The lower end portion of the valve tube 78 is provided with a port 81 which registers with the passageway 77 when said valve tube 78 is in the position shown in FIG. 13. The upper end portion of said valve tube 78 is provided with a free pour port 82 which registers with a free pour port 83 in the inner wall of discharge housing 74 when valve tube 78 is in the FIG. 13 position. A short baffle 84 extends downwardly from top wall 73 and is spaced from port 83. Preferably the pouring spout 80 has external knurling 85 to facilitate gripping the same and a collar 86 may be provided below the knurling 85 to limit downward movement of the tube 78 in the housing 74. The tube 78 and housing 74 are formed of at least partially transparent material and the position of the ports 81 and 82 can always be observed. However, if desired, means can be provided to limit rotary movement of said tube 78 in two directions.

The dispenser shown in FIGS. 13 and 14 can be used for free pouring by way of ports 82 and 83 when the valve tube 78 is in the position shown in FIG. 13. The baffle member 76 prevents material from passing through port 77 while free pouring is being done. When free pouring is discontinued and before the receptacle 70 is turned back into an upright position, the valve tube 78 is turned to close both ports 83 and 77. Then, if measured amounts of material are to be dispensed, the valve tube 78 is first turned to open port 77 and allow a desired amount of material to pass into measuring chamber and is then turned to close both the port 77 and the port 83, and the receptacle 70 is inverted to discharge the measured amount of material.

From the foregoing various arrangements and embodiments of the present invention, and principles and modes of operation set forth with respect thereto, it will be seen that various other modifications thereof may be undertaken within the skill of the art within the scope of the present invention, as set forth in the following claims.

I claim:
1. A measuring and dispensing device for finely divided dry material comprising a receptacle having an upright wall in the front portion of said receptacle dividing said receptacle into a material storage compartment and a combined material outlet and measuring chamber having continuously open discharge outlet as respects its top portion for discharge of metered material; said upright wall having a material flow passageway therethrough, the bottom edge of said passageway being spaced above the bottom of the receptacle a predetermined distance to provide a fixed maximum volume of metered material and manipulatively a fraction of said volume; an inclined baffle wall joined to and intersecting said upright dividing wall at the bottom edge of said outlet passageway, said baffle extending upwardly and rearwardly in the receptacle in a diverging relation from said upright dividing wall, said baffle wall cooperating in forming an open hopper to receive material from the storage compartment over the top edge of said baffle, material being directed from said hopper to said measuring chamber; and a valve member contacting and engaging only said upright wall and being slidably movable upwardly in opening the said passageway through said upright wall in permitting desired amount of metered material to fall into said measuring chamber and movable downwardly in closing said material flow passageway while maintaining open the outlet opening in the top portion of the receptacle and maintaining closed said passageway in the upright wall against inflow of unmetered material through said passageway until the metered material is discharged from said measuring and outlet chamber.

2. A measuring and dispensing device for finely divided dry material comprising a receptacle formed of material which is at least partially transparent, having an upright wall in the front portion of said receptacle dividing said receptacle into a material storage compartment and a combined material outlet and measuring chamber having continuously open discharge outlet as respects its top portion for discharge of metered material; said upright wall having a material flow passageway therethrough, the bottom edge of said passageway being spaced above the bottom of the receptacle a predetermined distance to provide a fixed maximum volume of metered material and manipulatively a fraction of said volume; an inclined baffle wall joined to and intersecting said upright dividing wall at the bottom edge of said outlet passageway, said baffle extending upwardly and rearwardly in the receptacle in a diverging relation from said upright dividing wall, said baffle wall cooperating in forming an open hopper to receive material from the storage compartment over the top edge of said baffle, material being directed from said hopper to said measuring chamber; and a valve member contacting and engaging only said upright wall and being slidably movable upwardly in opening the said passageway through said upright wall in permitting desired amount of metered material to fall into said measuring chamber and movable downwardly in closing said material flow passageway while maintaining open the outlet opening in the top portion of the receptacle and maintaining closed said passageway in the upright wall against inflow of unmetered material through said passageway until the metered material is discharged from said measuring and outlet chamber by a single tipping operation of the device.

References Cited in the file of this patent
UNITED STATES PATENTS

| | | |
|---|---|---|
| 842,815 | Steinmetz | Sept. 20, 1892 |
| 2,025,796 | Waldheim | Dec. 31, 1935 |
| 2,873,050 | Halverson | Feb. 10, 1959 |